(12) United States Patent
Wang et al.

(10) Patent No.: US 11,821,604 B2
(45) Date of Patent: *Nov. 21, 2023

(54) ADAPTIVE ILLUMINATING HEADLIGHT

(71) Applicant: CHIAN YIH OPTOTECH CO., LTD., Miaoli County (TW)

(72) Inventors: Cheng Wang, Taipei (TW); Wen-Hong Zhang, Miaoli County (TW)

(73) Assignee: CHIAN YIH OPTOTECH CO., LTD., Miaoli County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,792

(22) Filed: Aug. 19, 2022

(65) Prior Publication Data

US 2023/0087968 A1    Mar. 23, 2023

(30) Foreign Application Priority Data

Sep. 17, 2021   (TW) ................................. 110134728

(51) Int. Cl.
| | | |
|---|---|---|
| *F21S 41/675* | (2018.01) | |
| *F21S 41/25* | (2018.01) | |
| *F21S 41/143* | (2018.01) | |
| *F21W 107/13* | (2018.01) | |

(52) U.S. Cl.
CPC ........... *F21S 41/675* (2018.01); *F21S 41/143* (2018.01); *F21S 41/25* (2018.01); *F21W 2107/13* (2018.01)

(58) Field of Classification Search
None
See application file for complete search history.

(56) References Cited

U.S. PATENT DOCUMENTS

| | | |
|---|---|---|
| 4,075,469 A | 2/1978 | Alphen |
| 4,833,573 A | 5/1989 | Miyauchi et al. |
| 4,922,390 A * | 5/1990 | Nakazawa ............. B60Q 1/115 362/322 |
| 5,426,571 A | 6/1995 | Jones |
| 2009/0046474 A1 | 2/2009 | Sato et al. |

(Continued)

FOREIGN PATENT DOCUMENTS

| | | |
|---|---|---|
| CN | 208874455 U | 5/2019 |
| IT | MI 20131056 A1 | 12/2014 |

(Continued)

*Primary Examiner* — Elmito Breval
(74) *Attorney, Agent, or Firm* — Li & Cai Intellectual Property (USA) Office

(57) ABSTRACT

An adaptive illuminating headlight is provided. The adaptive illuminating headlight includes a stator structure, a rotor structure, a driver, a light emitting unit, an optical assembly, and a control unit, and is installed on a vehicle for use. The rotor structure is configured to rotate relative to the stator structure and has a carrying surface. The driver is arranged between the stator structure and the rotor structure to drive the rotor structure. The light emitting unit is arranged on the carrying surface to emit an illumination light beam. The optical assembly is configured to allow the illumination light beam to project outwardly so as to produce an illumination pattern. The control unit is configured to control the driver to operate according to a posture change of a vehicle body, such that the light emitting unit is driven by the rotor structure to rotate through a predetermined angle.

11 Claims, 18 Drawing Sheets

(56) References Cited

U.S. PATENT DOCUMENTS

2016/0339834 A1 11/2016 Oshima et al.
2020/0247493 A1 8/2020 Hashimoto

FOREIGN PATENT DOCUMENTS

| JP | 201582409 A | 4/2015 |
|----|----|----|
| JP | 2017100500 A | 6/2017 |
| JP | 201863891 A | 4/2018 |
| TW | 201900457 A | 1/2019 |
| WO | WO 2015115319 A1 | 8/2015 |
| WO | WO 2019178365 A1 | 9/2019 |

* cited by examiner

ADAPTIVE ILLUMINATING HEADLIGHT

CROSS-REFERENCE TO RELATED PATENT APPLICATION

This application claims the benefit of priority to Taiwan Patent Application No. 110134728, filed on Sep. 17, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an illumination device and more particularly to an adaptive illuminating headlight suitable for two-wheel or four-wheel vehicles.

BACKGROUND OF THE DISCLOSURE

The headlight (headlamp), referred to by some as the "eyes" of a vehicle such as a motorcycle or a car, is very important for traffic safety. In the early days, an illumination pattern provided by each of low and high beams in the headlight has a fixed orientation and cannot be adjusted to adapt to a tilt angle of a vehicle body. This may cause many inadequacies in actual use. For example, when the vehicle is running on a curved road, the illumination pattern produced by the vehicle may be tilted to the right or left. As a result, a dark region may be present in front of the vehicle so that the driver is unable to clearly see road conditions at an inner side of the curved road, which may cause a traffic accident to occur.

With the continuous advancement of lighting technology for vehicles, more and more headlights with an adjustable lighting pattern have appeared on the market. Such headlights can adjust characteristics of the illumination pattern according to a tilt angle of a vehicle body, such as an illumination range and an illumination distance, so that the driver can be provided with the best possible vision to ensure driving safety. Among them, a headlight uses a plurality of fill lights to provide auxiliary lighting for corners. However, due to the arrangement of the fill lights, a volume of the headlight may be unable to be reduced.

SUMMARY OF THE DISCLOSURE

In response to the above-referenced technical inadequacies, the present disclosure provides an adaptive illuminating headlight that can provide sufficient frontal illumination without the use of auxiliary light sources when a vehicle is making a turn or running on a curved road.

In one aspect, the present disclosure provides an adaptive illuminating headlight installed on a vehicle for use. The adaptive illuminating headlight includes a stator structure, a rotor structure, a driver, a light emitting unit, an optical assembly, and a control unit. The rotor structure is configured to rotate relative to the stator structure and has a carrying surface. The driver is arranged between the stator structure and the rotor structure to drive the rotor structure. The light emitting unit is arranged on the carrying surface to emit an illumination light beam. The optical assembly is configured to allow the illumination light beam to project outwardly so as to produce an illumination pattern. The control unit is configured to control the driver to operate according to a posture change of a vehicle body, such that the light emitting unit is driven by the rotor structure to rotate through a predetermined angle.

In certain embodiments, the optical assembly includes an optical lens that is integrally connected to the rotor structure via a connecting structure, and a light input surface of the optical lens is opposite to a light emitting surface of the light emitting unit.

In certain embodiments, the light emitting unit is configured to emit the illumination light beam toward the light input surface of the optical lens.

In certain embodiments, the rotor structure includes a base portion and a housing portion extending from the base portion, the carrying surface is located on the base portion, and the base portion and the housing portion jointly define an accommodating space. The stator structure is located in the accommodating space and includes an end portion and a shaft portion extending from the end portion, and the shaft portion is closer to the base portion of the rotor structure than the end portion. The driver includes a coil structure and a magnetic body that are disposed between the shaft portion of the stator structure and the housing portion of the rotor structure.

In certain embodiments, the coil structure is fixed to the shaft portion of the stator structure, and the magnetic body is fixed to the housing portion of the rotor structure.

In certain embodiments, the driver further includes at least one bearing that is surroundingly disposed on the shaft portion of the stator structure and spaced apart from the coil structure.

In certain embodiments, the adaptive illuminating headlight further includes a back cover for closing the accommodating space, and the control unit includes a control printed circuit board (PCB) located in the accommodating space.

In certain embodiments, the optical assembly includes a light guiding member, an optical lens, and a light distributing member. The light guiding member is configured to guide the illumination light beam to travel along a predetermined path. The optical lens and the light distributing member are arranged at positions on the predetermined path. The light distributing member is located between the optical lens and the light emitting unit to selectively block the illumination light beam so as to modify the illumination pattern.

In certain embodiments, the light guiding member, the optical lens, and the light distributing member are configured to be driven by the rotor structure so as to simultaneously rotate with the light emitting unit. The light emitting unit has a light emitting surface, and the light guiding member has a reflecting surface that covers the light emitting surface.

In certain embodiments, the light emitting unit is configured to emit the illumination light beam toward the reflecting surface of the light guiding member.

In certain embodiments, the light distributing member is configured to move between a first position and a second position below the first position. The light distributing member at the first position blocks a portion of the illumination light beam travelling along the predetermined path, such that the illumination pattern is a low beam illumination pattern. The light distributing member at the second position allows all the illumination light beam travelling along the predetermined path to enter the optical lens through a light input surface of the optical lens, such that the illumination pattern is a high beam illumination pattern.

In certain embodiments, the rotor structure includes a base portion and a housing portion extending from the base portion, the carrying surface is located on the base portion, and the base portion and the housing portion jointly define an accommodating space. The stator structure includes an end portion located outside the accommodating space and a shaft portion extending into the accommodating space from the end portion. The driver includes a coil structure and a magnetic body that are disposed between the shaft portion of the stator structure and the housing portion of the rotor structure.

In certain embodiments, the coil structure is fixed to the shaft portion of the stator structure, and the magnetic body is fixed to the housing portion of the rotor structure.

In certain embodiments, the driver further includes at least one bearing that is surroundingly disposed on the shaft portion of the stator structure and spaced apart from the coil structure.

In certain embodiments, the base portion of the rotor structure further includes a limiting groove located in the accommodating space, and the at least one bearing is embedded in the limiting groove.

In certain embodiments, the control unit includes a printed circuit board (PCB) located on the end portion of the stator structure.

In certain embodiments, the optical assembly includes a light guiding member that is configured to guide the illumination light beam to travel along a predetermined path.

In certain embodiments, the light guiding member corresponds in position to the light emitting unit and has a reflecting surface that covers a light emitting surface of the light emitting unit.

Therefore, in the adaptive illuminating headlight provided by the present disclosure, by virtue of a particular design of the stator structure and the rotor structure being compactly integrated with the driver, the light emitting unit, the optical assembly, and the control unit, an overall structure of the adaptive illuminating headlight is simple, reliable, and durable. More specifically, the driver and the control unit are integrated into the rotor structure, such that they are not easily affected by external environmental factors such as water and dust, thereby extending the lifespan of the adaptive illuminating headlight.

Furthermore, the adaptive illuminating headlight of the present disclosure can be installed on a two-wheel or four-wheel vehicle for use. When the vehicle is making a turn or running on a curved road, the control unit can control the driver to operate according to a posture change of a vehicle body (e.g., whether the vehicle body leans to the left or right at an angle relative to a road surface), such that the light emitting unit and the optical assembly are driven by the rotor structure to rotate through a predetermined angle, so as to reduce or even eliminate a dark region in front of the vehicle.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
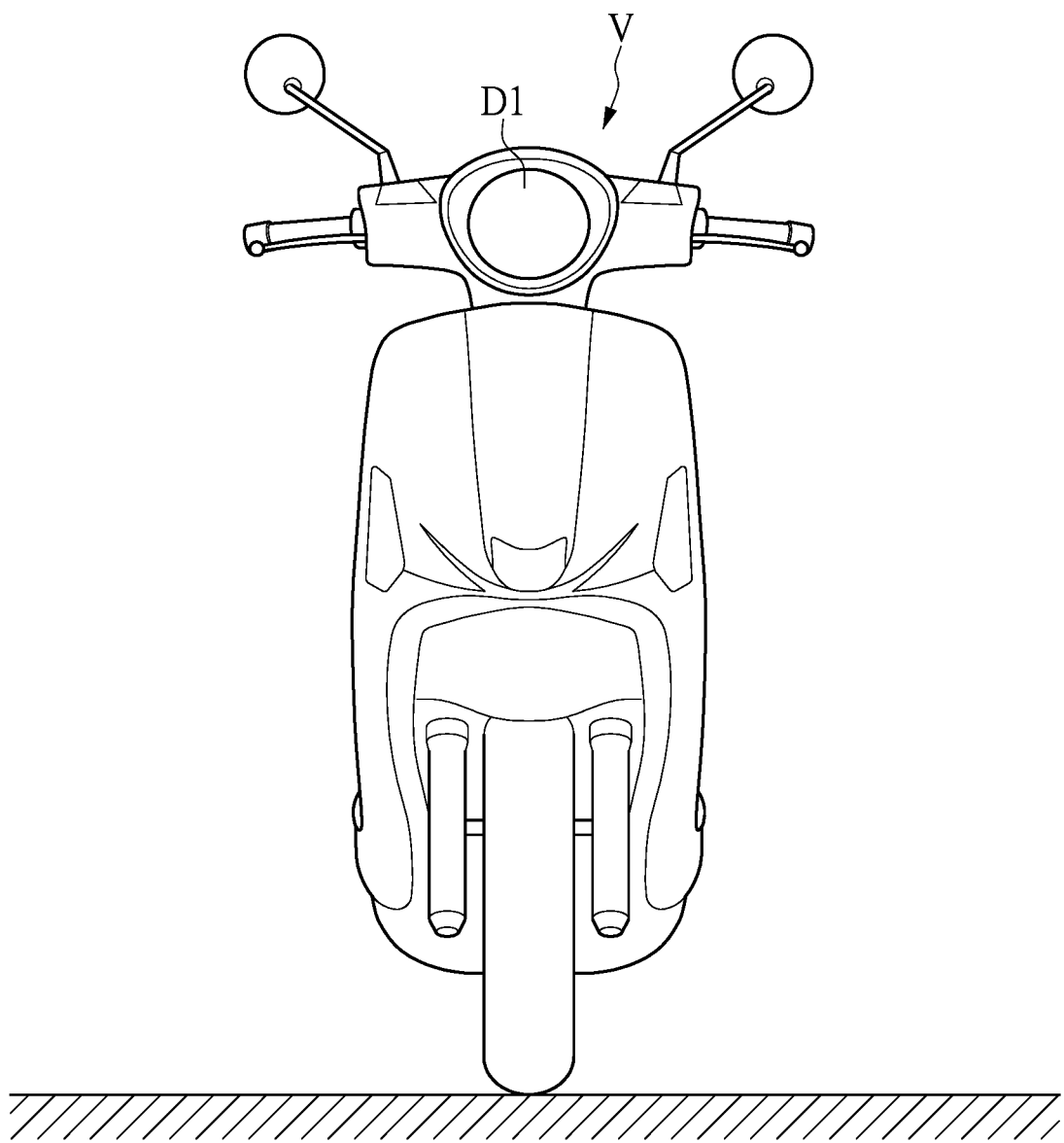
FIG. 1 shows a practical example of an adaptive illuminating headlight according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

All illumination patterns as described herein are illumination patterns having a cut-off line, such as illumination patterns meeting the light distribution requirements of the ECE R113 regulation which regulates headlamps for producing a symmetrical light pattern.

First Embodiment

Figure 2:
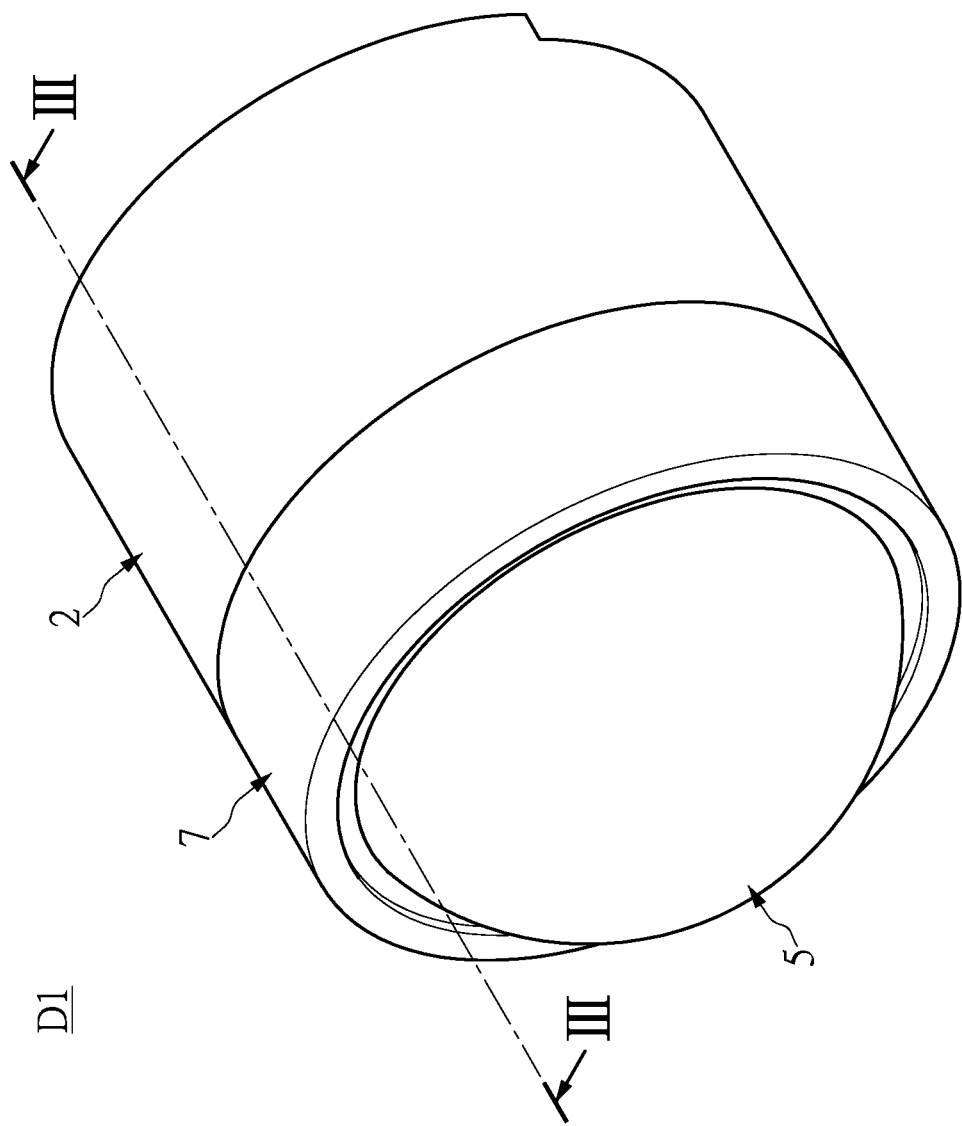
FIG. 2 is a perspective assembled view of the adaptive illuminating headlight according to the first embodiment of the present disclosure.
Figure 3:
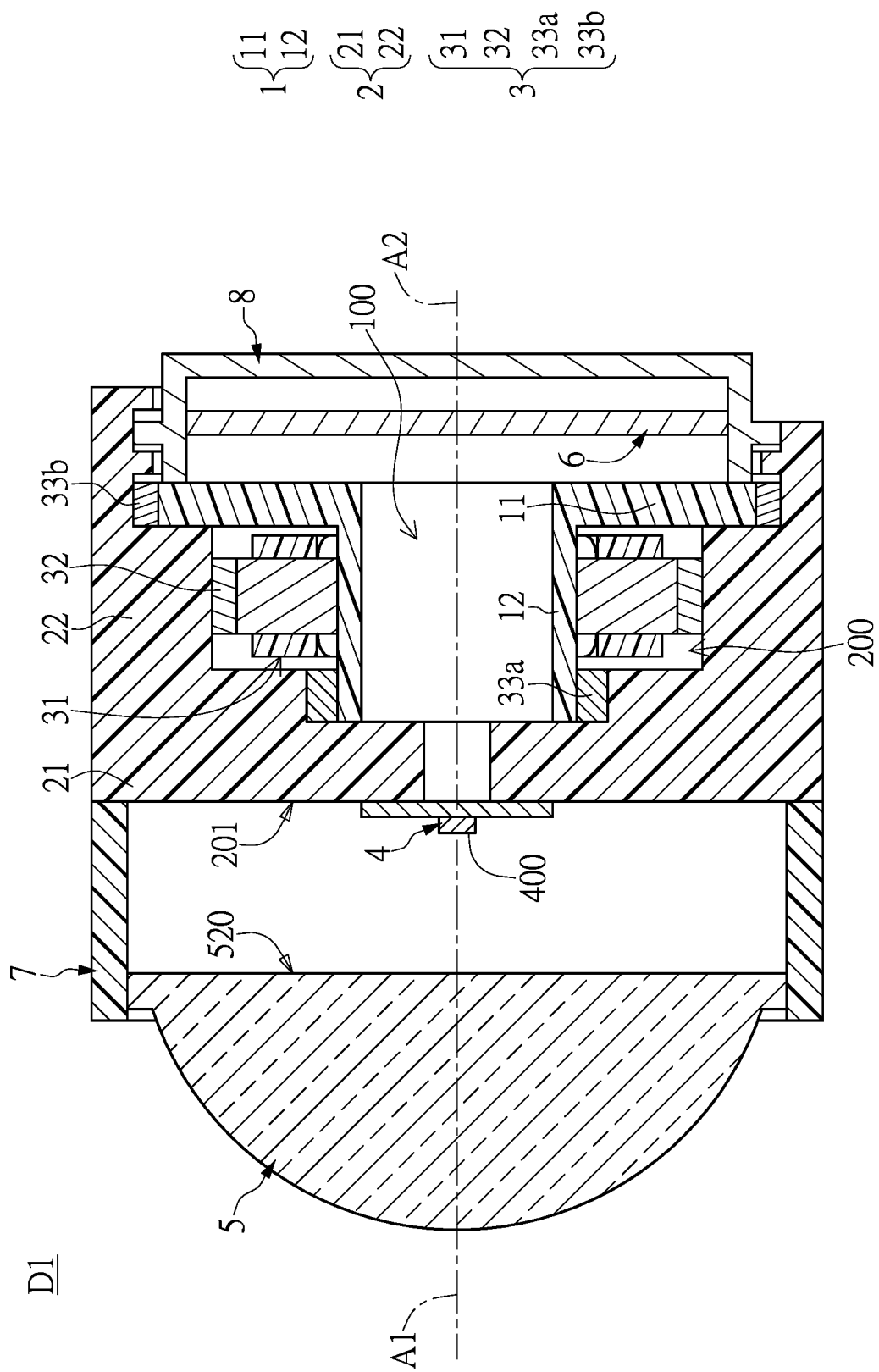
FIG. 3 is a schematic cross-sectional view taken along line III-III of FIG. 2.
Figure 4:
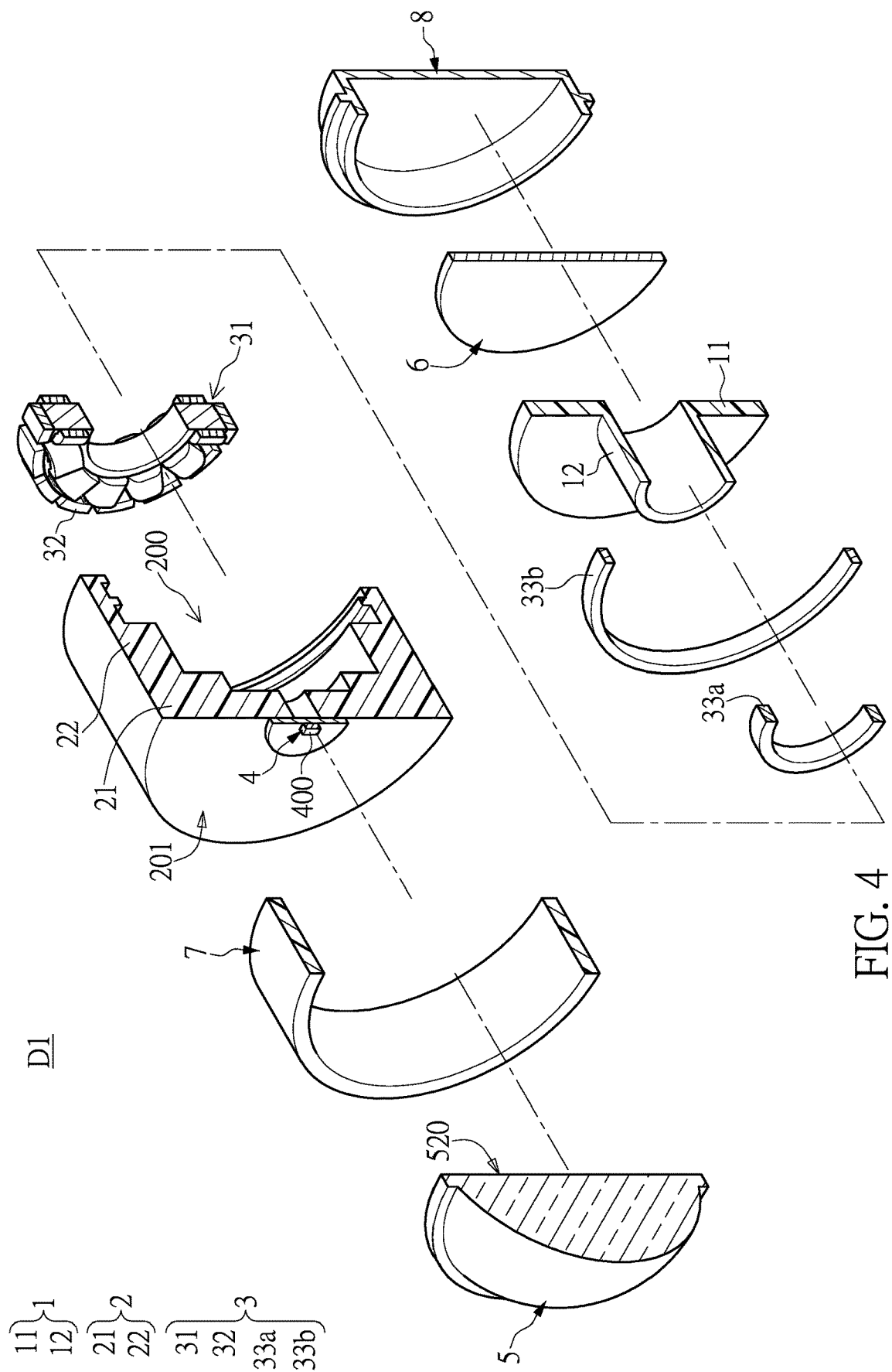
FIG. 4 is a perspective exploded view of the adaptive illuminating headlight according to the first embodiment of the present disclosure.

Reference is made to FIG. 1 to FIG. 4. FIG. 1 shows a practical application example of an adaptive illuminating headlight D1 according to a first embodiment of the present disclosure. FIG. 2 to FIG. 4 show a structure of the adaptive illuminating headlight D1 according to the first embodiment of the present disclosure. As shown in the above figures, the adaptive illuminating headlight D1 mainly includes a stator structure 1, a rotor structure 2, a driver 3, a light emitting unit 4, an optical assembly 5, and a control unit 6. The rotor structure 2 is configured to rotate relative to the stator structure 1 and has a carrying surface 201. The driver 3 is arranged between the stator structure 1 and the rotor structure 2 to drive the rotor structure 2. The light emitting unit 4 is arranged on the carrying surface 201 to emit an illumination light beam. The optical assembly 5 is configured to allow the illumination light beam to project outwardly so as to produce an illumination pattern. The optical assembly 5 is integrally connected to the rotor structure 2. The control unit 6 is configured to control an operation of the driver 3 to generate changes in magnetic field according to a posture change of a vehicle body (e.g., the vehicle body leans to the left or right at an angle relative to a road surface), such that the light emitting unit 4 and the optical assembly 5 are driven by the rotor structure 2 to rotate through a predetermined angle. The adaptive illuminating headlight D1 can be installed on a two-wheel motor vehicle V such as a fuel or electric motorcycle, such that the vehicle V can be provided with sufficient frontal illumination when making a turn, thereby reducing or even eliminating a dark region in front of the vehicle V. Specific details will be described below.

In an optical design of the present disclosure, the light emitting unit 4 directly emits an illumination light beam toward the optical assembly 5. More specifically, the optical assembly 5 includes an optical lens that has a light input surface 520 and an optical axis A1. The light input surface 520 is opposite to a light emitting surface 400 of the light emitting unit 4, and the optical axis A1 is parallel to a rotation axis A2 of the rotor structure 2. Preferably, the light input surface 520 is opposite and parallel to the light emitting surface 400 of the light emitting unit 4, and the optical axis A1 coincides with or is slightly offset from the rotation axis A2.

In practice, the optical assembly 5 can include an asymmetric optical lens, in which curvatures in the horizontal direction and the vertical direction are different from each other. The optical assembly 5 can be integrally connected to the rotor structure 2 via a connecting structure 7. Accordingly, the optical assembly 5 can be driven by the rotor structure 2 to rotate together with the light emitting unit 4, i.e., the light emitting unit 4 and the optical assembly 5 are driven by the rotor structure 2 to simultaneously rotate through a predetermined angle. The connecting structure 7 can be a metal or plastic frame, but is not limited thereto. In certain embodiments, the connecting structure 7 and the rotor structure 2 can be formed into a unitary structure from a metal material. In certain embodiments, the connecting structure 7 and the optical assembly 5 can be formed into a unitary structure from a plastic material. The above description is for exemplary purposes only and is not intended to limit the scope of the present disclosure.

In order to integrate the stator structure 1 with the rotor structure 2, the driver 3, the light emitting unit 4, the optical assembly 5, and the control unit 6 in a compact manner, the rotor structure 2 is designed to include a base portion 21 and a housing portion 22 extending from the base portion 21, and to have an accommodating space 200, in which the carrying surface 201 is located on the base portion 21. In practice, the base portion 21 can be a plate-like structure to provide support for the light emitting unit 4 and the optical assembly 5. The housing portion 22 can be a cylindrical structure to define the accommodating space 200 together with the base portion 21. In an embodiment not shown in the above figures, the carrying surface 201 can have one or more convex or concave regions to conveniently carry the light emitting unit 4 or the optical assembly 5. In addition, the stator structure 1 serving as the basis of the entire headlight structure is designed to be incorporated into the accommodating space 200, and includes an end portion 11 and a shaft portion 12 extending from the end portion 11, in which the shaft portion 12 is closer to the base portion 21 of the rotor structure 2 than the end portion 11. In practice, the end portion 11 can be a plate-like structure to stably retain the driver 3 between the stator structure 1 and the rotor structure 2. The shaft portion 12 can be a cylindrical structure to provide support and to define the rotation axis A2. The above description is for exemplary purposes only and is not intended to limit the scope of the present disclosure.

In the present embodiment, the driver 3 can be a brushless pan/tilt motor that mainly includes a coil structure 31 and a magnetic body 32. The coil structure 31 and the magnetic body 32 are disposed between the shaft portion 12 of the stator structure 1 and the housing portion 22 of the rotor structure 2. In practice, the coil structure 31 can include iron cores with coils wound thereon and be fixed to the shaft portion 12 of the stator structure 1. The magnetic body 32 can include one or more magnets and be fixed to the housing portion 22 of the rotor structure 2. Accordingly, the coil structure 31 and the magnetic body 32 can work with each other to produce an electromagnetic torque, thereby allowing the rotor structure 2 to rotate around the rotation axis A2 in a clockwise or counterclockwise direction. In order for the rotation of the rotor structure 2 to be more stable and smooth, the driver 3 can further include a first bearing 33a and a second bearing 33b. The first bearing 33a can be surroundingly disposed on the shaft portion 12 of the stator structure 1 and spaced apart from the coil structure 31, and the second bearing 33b can be surroundingly disposed on the end portion 11 of the stator structure 1. The above description is for exemplary purposes only and is not intended to limit the scope of the present disclosure.

The light emitting unit 4 can be fixed to the carrying surface 201 of the rotor structure 2 via a circuit board having high thermal conductivity (not numbered) such as a metal core PCB (MCPCB). The circuit board at least has driving functions of the light emitting unit 4, and can drive the light emitting unit 4 according to received signals, so as to allow the light emitting unit 4 to produce a target lighting effect (e.g., a color or brightness effect). More specifically, the light emitting unit 4 is mounted on and electrically connected to the circuit board, and the circuit board is fixed to the carrying surface 201 of the rotor structure 2. In practice, the light emitting unit 4 can be an LED package structure that includes a first light emitting unit and a second light emitting unit. The first light emitting unit and the second light emitting unit can be arranged in proximity to a focus of the optical assembly 5 (e.g., optical lens), and the first light emitting unit is located above the second light emitting unit. Each of the first light emitting unit and the second light emitting unit includes one or more LED chips. Accordingly, when only the first light emitting unit is lit, an illumination light beam emitted therefrom can be projected outwardly through the optical assembly 5 to produce a low beam illumination pattern. When both the first light emitting unit and the second light emitting unit are lit, illumination light beams emitted therefrom can be projected outwardly through the optical assembly 5 to produce a high beam illumination pattern. The above description is for exemplary purposes only and is not intended to limit the scope of the present disclosure.

It should be noted that, if the rotor structure 2 is made of a metal material, heat generated by the light emitting unit 4 will be quickly transmitted to a peripheral region of the rotor structure 2 through the circuit board and dissipated to the outside. If the rotor structure 2 and the connecting structure 7 are both made of a metal material, heat generated by the light emitting unit 4 will be quickly transmitted to peripheral regions of the rotor structure 2 and the connecting structure 7 through the circuit board and dissipated to the outside.

The control unit 6 is arranged in the accommodating space 200 of the rotor structure 2, and can include a control PCB and one or more sensors (e.g., an accelerometer and a gyroscope). The control PCB can have a motor driver IC and its related components provided thereon. The adaptive illuminating headlight D1 of the present disclosure can further include a back cover 8 that is assembled to an open end of the housing portion 22 of the rotor structure 2 to close the accommodating space 200, so as to isolate the control unit 6 from an external environment, such that the control unit 6 is not easily affected by external environmental factors such as water and dust.

It is worth mentioning that the stator structure 1 can have a wire groove 100 extending through the end portion 11 and the shaft portion 12 for allowing wire(s) from the light emitting unit 4 to pass therethrough. Therefore, the wire(s) will not interfere with mechanical parts, so that the headlight can work normally for a long period of time.

Figure 5:
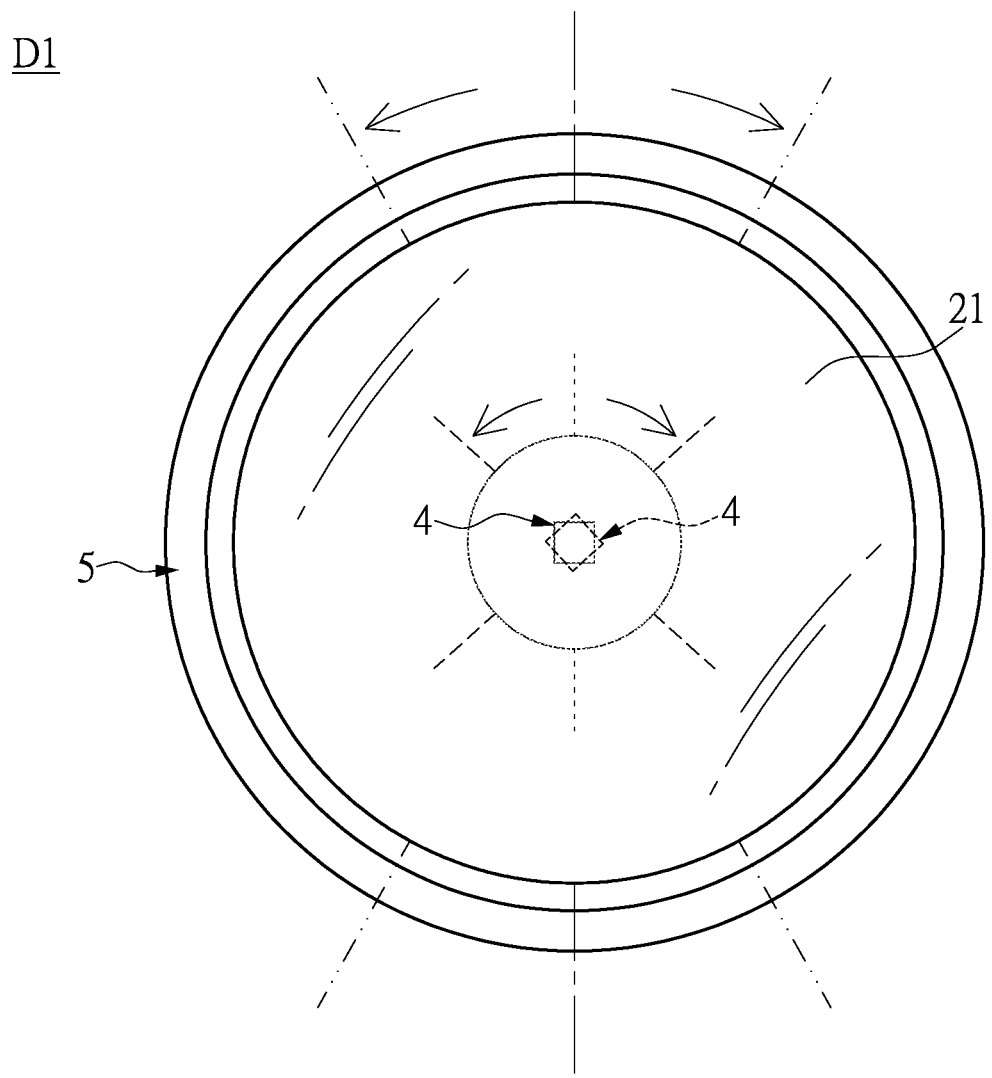
FIG. 5 shows operations of the adaptive illuminating headlight according to the first embodiment of the present disclosure.
Figure 6:
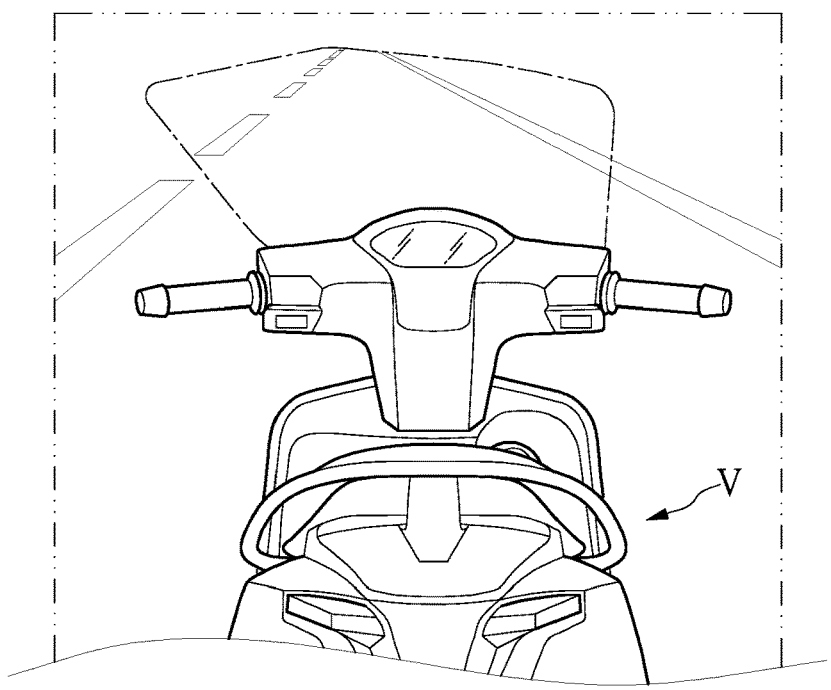
FIG. 6 to FIG. 10 show application scenarios of the adaptive illuminating headlight according to the first embodiment of the present disclosure.

Reference is made to FIG. 5 to FIG. 10, which show actual application scenarios of the adaptive illuminating headlight D1 of the present disclosure. The adaptive illuminating headlight D1 can provide sufficient frontal illumination for a running vehicle V (e.g., a fuel or electric motorcycle), so as to reduce or even eliminate a dark region BA in front of the vehicle V. The detailed descriptions are as follows. When the vehicle V is running on a straight road, no rotation is required for the light emitting unit 4 and the optical assembly 5 (e.g., optical lens) since a vehicle body is maintained perpendicular to a road surface. Thus, a resulting illumination pattern P is in a horizontal state and no dark regions are present in front of the vehicle V, as shown in FIG. 6.

Figure 7:
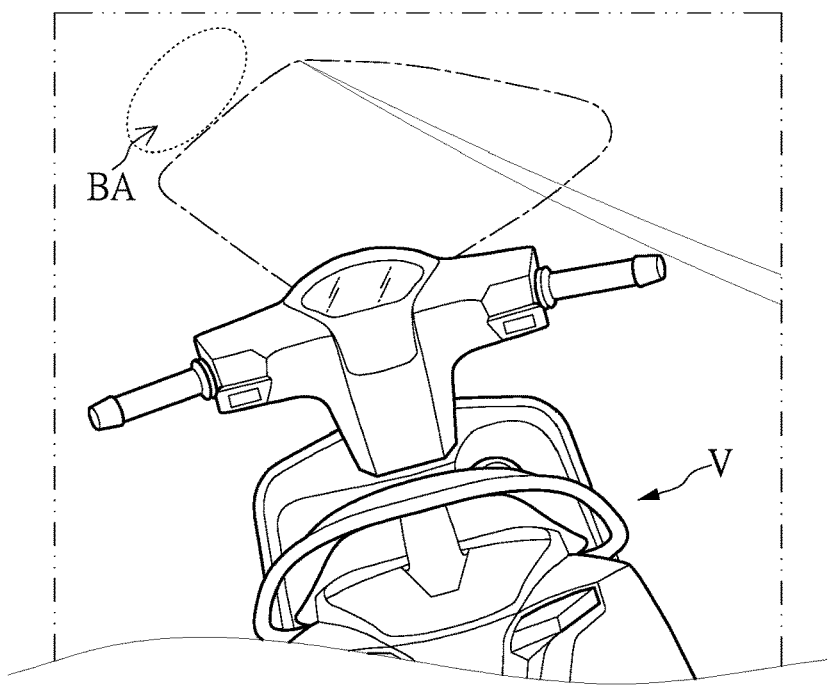
Figure 8:
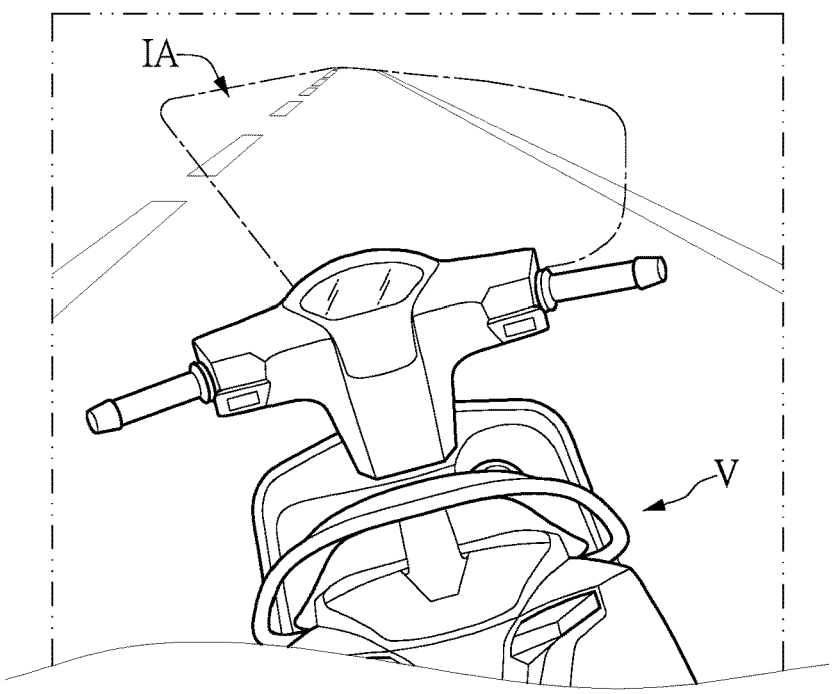

When the vehicle V is running on a left curved road, the vehicle body leans to the left at an angle relative to a road surface. In such a situation, if the light emitting unit 4 and the optical assembly 5 does not rotate, a resulting illumination pattern P will be tilted and the left side thereof is lower than the right side thereof. As a result, a dark region BA is present at a front-left of the vehicle V, as shown in FIG. 7. In contrast, in the present embodiment, the control unit 6 can cause an operation of the driver 3 to bring about changes in magnetic field according to a posture change of the vehicle body, such that the light emitting unit 4 and the optical assembly 5 are driven by the rotor structure 2 to rotate right through a predetermined angle in a clockwise direction viewing from the driver, as shown in FIG. 5. As a result, the illumination pattern P is still maintained in the horizontal state, and an auxiliary illumination region IA can be produced to eliminate the dark region at the front-left of the vehicle V, as shown in FIG. 8.

Figure 9:
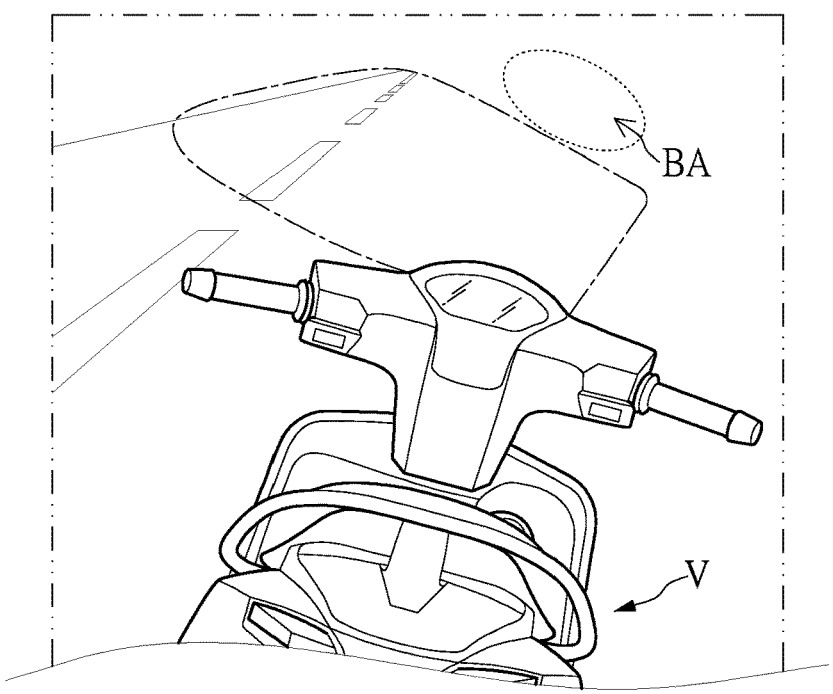
Figure 10:
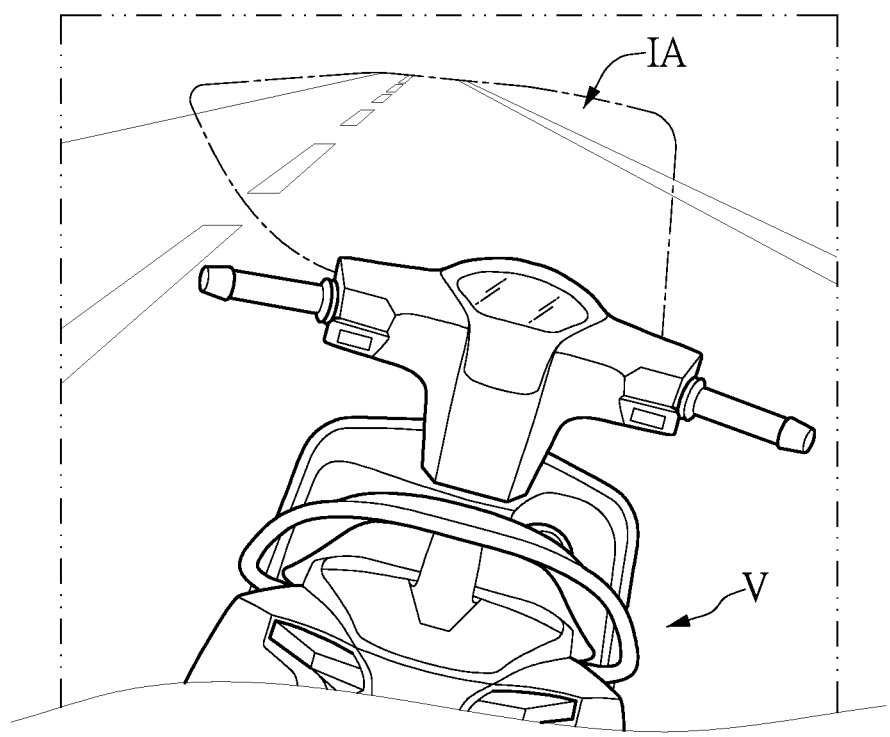

When the vehicle is running on a right curved road, the vehicle body V leans to the right at an angle relative to a road surface. In such a situation, if the light emitting unit 4 and the optical assembly 5 does not rotate, a resulting illumination pattern P will be tilted and the left side thereof is higher than the right side thereof. As a result, a dark region BA is present at the front-right of the vehicle V, as shown in FIG. 9. In contrast, in the present embodiment, the control unit 6 can cause an operation of the driver 3 to bring about changes in magnetic field according to a posture change of the vehicle body, such that the light emitting unit 4 and the optical assembly 5 are driven by the rotor structure 2 to rotate left through a predetermined angle in a counterclockwise direction viewing from the driver, as shown in FIG. 5. As a result, the illumination pattern P is still maintained in the horizontal state, and an auxiliary illumination region IA can be produced to eliminate the dark region at the front-right of the vehicle V, as shown in FIG. 10.

Figure 20:
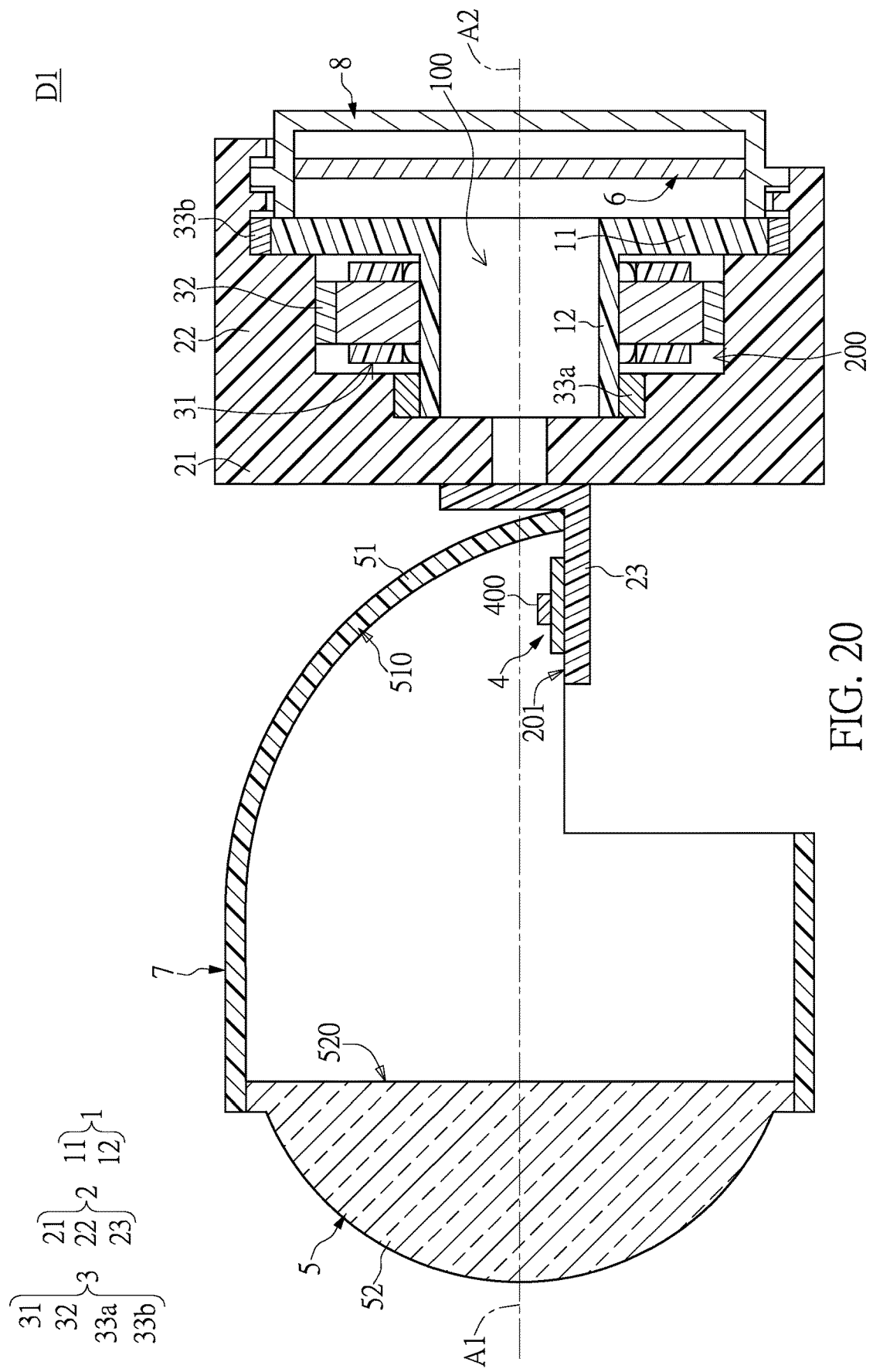
FIG. 20 is a schematic view of an adaptive illuminating headlight according to a variant embodiment of the present disclosure.

Reference is made to FIG. 20, which shows a variant embodiment of the adaptive illuminating headlight D1 of the present disclosure. As shown in FIG. 20, in the adaptive illuminating headlight D1, the rotor structure 2 can further include a carrying portion 23, in addition to the base portion 21 and the housing portion 22. The carrying portion 23 can be integrally connected to the base portion 21, and the carrying portion 23 and the housing portion 22 can be respectively located at left and right sides of the base portion 21. Furthermore, the optical assembly 5 can include a light guiding member 51 and an optical lens 52 that are configured to allow the illumination light beam to project outwardly so as to produce an illumination pattern.

More specifically, the carrying portion 23 is located between the base portion 21 and the optical lens 52. The carrying surface 201 is located on the carrying portion 23, and the light emitting unit 4 and the light guiding member 51 are arranged on the carrying surface 201. The light guiding member 51 has a reflecting surface 510 that covers the light emitting surface 400 of the light emitting unit 4, and the light emitting surface 400 preferably faces the reflecting surface 510. In practice, the carrying portion 23 can be an L-shaped structure and the light guiding member 51 can be a light reflecting cup, but the present disclosure is not limited thereto. In such a structure, an illumination light beam emitted from the light emitting unit 4 can be reflected by the reflecting surface 510 of the light guiding member 51 and projected to the light input surface 520 of the optical lens 52, and the light guiding member 51 and the light emitting unit 4 can be driven together by the rotor structure 2.

Second Embodiment

Figure 11:
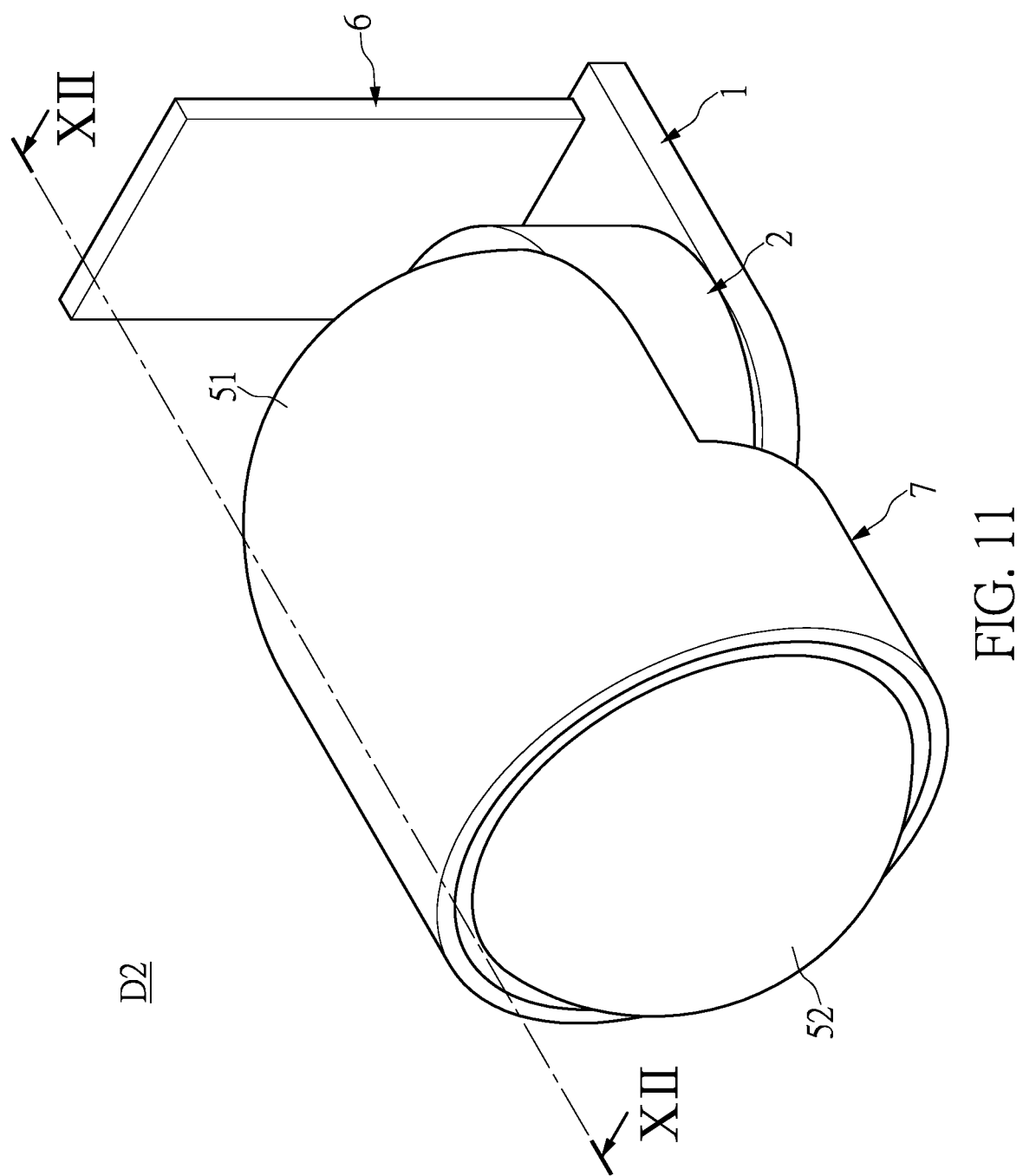
FIG. 11 is a perspective assembled view of an adaptive illuminating headlight according to a second embodiment of the present disclosure.
Figure 12:
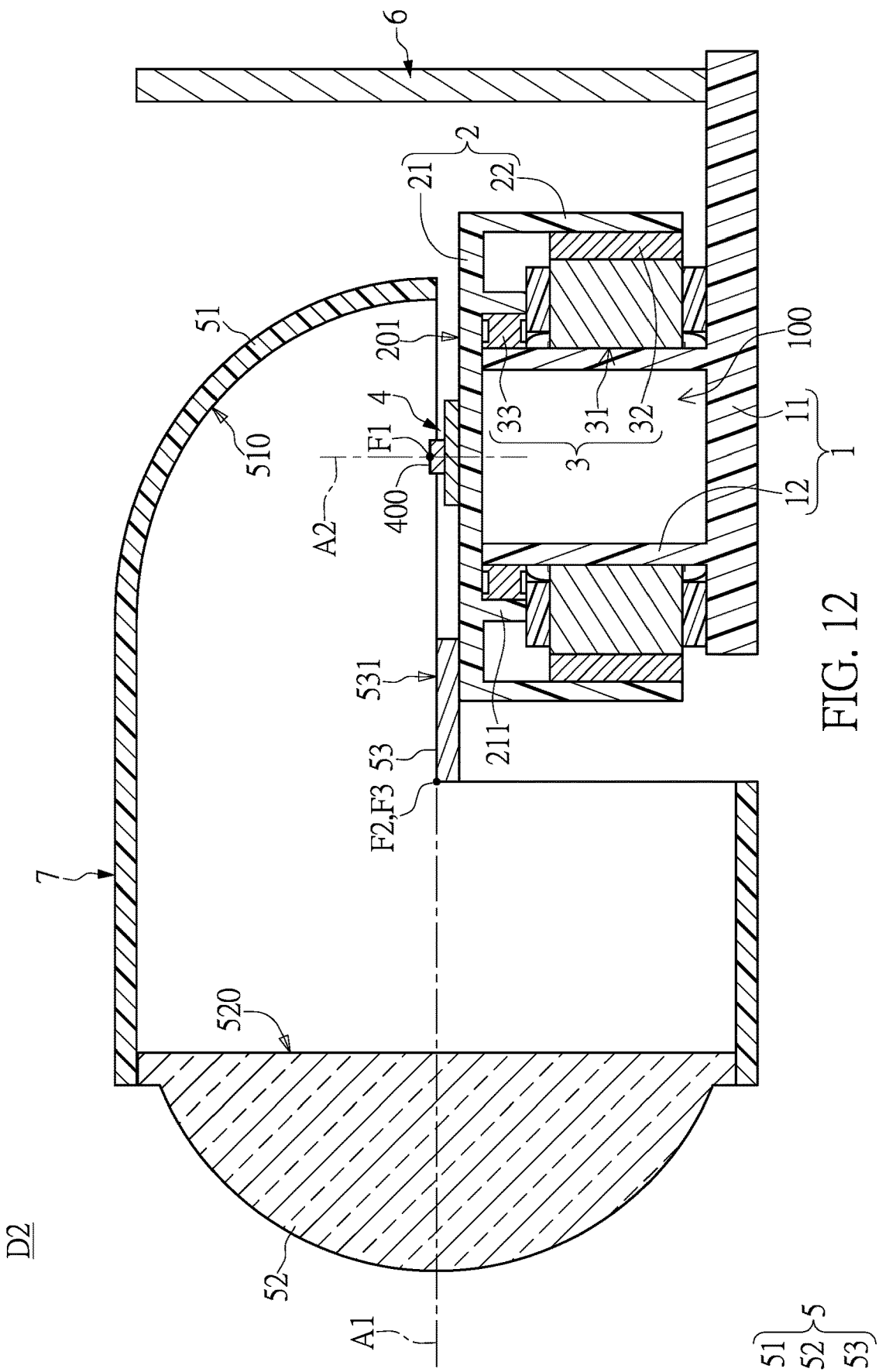
FIG. 12 is a schematic cross-sectional view taken along line XII-XII of FIG. 11.
Figure 13:
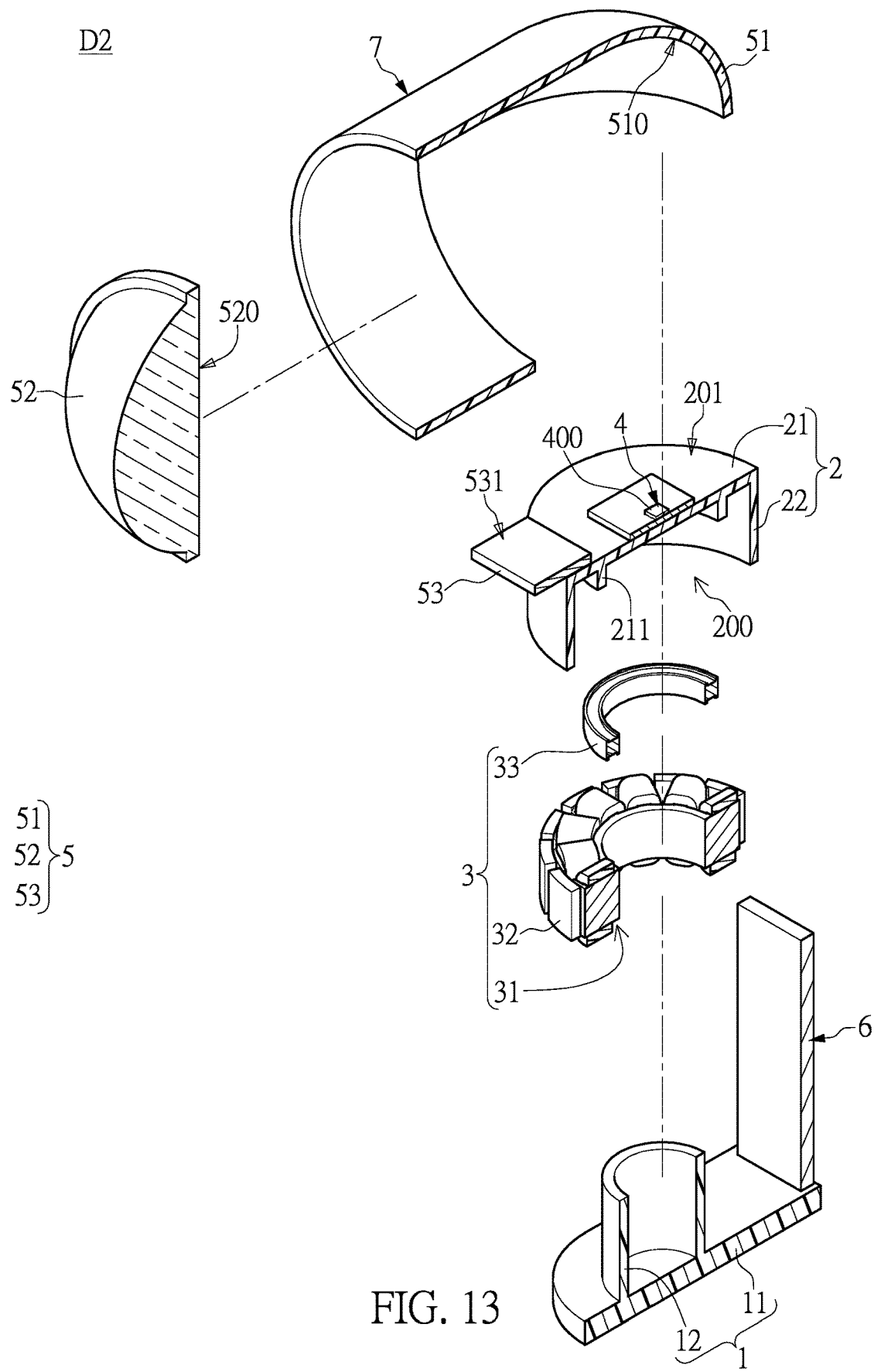
FIG. 13 is a perspective exploded view of the adaptive illuminating headlight according to the second embodiment of the present disclosure.

Reference is made to FIG. 11 to FIG. 13, which show a structure of an adaptive illuminating headlight D2 according to the second embodiment of the present disclosure. As shown in the above figures, the adaptive illuminating headlight D2 mainly includes a stator structure 1, a rotor structure 2, a driver 3, a light emitting unit 4, an optical assembly 5, and a control unit 6. The rotor structure 2 is configured to rotate relative to the stator structure 1 and has a carrying surface 201. The driver 3 is arranged between the stator structure 1 and the rotor structure 2 to drive the rotor structure 2. The light emitting unit 4 is arranged on the carrying surface 201 of the rotor structure 2 to emit an illumination light beam. The optical assembly 5 is configured to allow the illumination light beam to project outwardly so as to produce an illumination pattern. The optical assembly 5 is integrally connected to the rotor structure 2. The control unit 6 is configured to cause an operation of the driver 3 to bring about changes in magnetic field according to a posture change of a vehicle body, such that the light emitting unit 4 and the optical assembly 5 are driven by the rotor structure 2 to rotate through a predetermined angle. The adaptive illuminating headlight D2 can be installed on a two-wheel or four-wheel motor vehicle V for use, such as a fuel or electric motorcycle, such that the vehicle V can be provided with sufficient frontal illumination when turning, thereby reducing or even eliminating a dark region in front of the vehicle V.

The relevant technical details mentioned in the first embodiment still apply in the present embodiment and will not be repeated herein for the sake of brevity. Similarly, the technical details mentioned in the present embodiment may also be applied to the first embodiment.

It should be noted that the present embodiment employs a different optical system from the first embodiment and a modified headlight structure in which a rotation axis A2 of the rotor structure 2 and an optical axis A1 of the optical assembly 5 are perpendicular or substantially perpendicular to each other, and are preferably perpendicular to each other. In the present embodiment, the optical assembly 5 includes a light guiding member 51, an optical lens 52, and a light distributing member 53. The light guiding member 51 is configured to guide the illumination light beam emitted from the light emitting unit 4 to travel along a predetermined path. The optical lens 52 and the light distributing member 53 are arranged at positions on the predetermined path, and the light distributing member 53 is located between the optical lens 52 and the light emitting unit 4 to selectively block the illumination light beam so as to modify the illumination pattern. Furthermore, the light guiding member 51, the optical lens 52, and the light distributing member 53 are configured to be driven by the rotor structure 2 so as to simultaneously rotate with the light emitting unit 4.

More specifically, the light guiding member 51 corresponds in position to the light emitting unit 4 and has a reflecting surface 510 that covers a light emitting surface 400 of the light emitting unit 4. In practice, the light guiding member 51 can be a light reflecting cup and the reflecting surface 510 can define a first focus F1 and a second focus F2. The first focus F1 is located in a cover region of the light guiding member 51, and the second focus F2 is located in proximity to an edge of the cover region of the light guiding member 51. In the optical system of the present embodiment, the first focus F1 can be located on or below the optical axis A1, and is preferably located below the optical axis A1. The light emitting unit 4 can be located on or in proximity to the first focus F1 and located on or in proximity to the rotation axis A2, so that the rotation of the rotor structure 2 becomes more stable and smooth. Furthermore, the second focus F2 can coincide with or be in proximity to a lens focal point F3, and preferably coincides with the lens focal point F3. Accordingly, an illumination light beam emitted from the light emitting unit 4 can be reflected by the reflecting surface 510 of the light guiding member 51 to project to a light input surface 520 of the optical lens 52. The above description is for exemplary purposes only and is not intended to limit the scope of the present disclosure. For example, depending on particular requirements, the light guiding member 51 may be a reflecting structure other than the light reflecting cup.

The optical lens 52 can be a circularly symmetric optical lens, and can be integrally connected to the light guiding member 51 via a connecting structure 7. The connecting structure 7 can be a metal or plastic frame, but is not limited thereto. In certain embodiments, the connecting structure 7, the light guiding member 51, and the optical lens 52 can be formed from a plastic material and into a unitary structure. The above description is for exemplary purposes only and is not intended to limit the scope of the present disclosure.

The light distributing member 53 can be a light shielding plate and a top portion thereof has an optically effective edge 531 (also referred to as "cut-off edge") to adjust light distribution, thereby producing a low beam or high beam illumination pattern having a clear cut-off line and contour. Furthermore, the light distributing member 53 is configured to move between a first position and a second position below the first position. When the light distributing member 53 is moved to the first position, the adaptive illuminating headlight D2 will be switched to a low beam mode. When the light distributing member 53 is moved to the second position, the adaptive illuminating headlight D2 will be switched to a high beam mode. More specifically, the light distributing member 53 can be driven by a solenoid valve driver (not shown in FIG. 11 to FIG. 13) to reciprocally move between the first position and the second position, but the present disclosure is not limited thereto. The light distributing member 53 at the first position can block a portion of the illumination light beam travelling along the predetermined path, thereby producing a low beam illumination pattern. The light distributing member 53 at the second position can allow all the illumination light beam travelling along the predetermined path to enter the optical lens 52 through the light input surface 520, thereby producing a high beam illumination pattern. The above description is for exemplary purposes only and is not intended to limit the scope of the present disclosure.

The detailed features and assembling manner of the stator structure 1, the rotor structure 2, the driver 3, and the light emitting unit 4 will be described below. As shown in FIG. 11 to FIG. 13, the rotor structure 2 is designed to include a base portion 21 and a housing portion 22 extending from the base portion 21 and to have an accommodating space 200, in which the carrying surface 201 is located on the base portion 21. In practice, the base portion 21 can be a plate-like structure to provide support for the light emitting unit 4 and the optical assembly 5. The housing portion 22 can be a cylindrical structure to define the accommodating space 200 together with the base portion 21. In an embodiment not shown in the above figures, the carrying surface 201 can have one or more convex or concave regions to conveniently hold the light emitting unit 4 or the optical assembly 5. In addition, the stator structure 1 serving as the basis of the entire headlight structure is designed to include an end portion 11 located outside the accommodating space 200 and a shaft portion 12 extending into the accommodating space 200 from the end portion 11. In practice, the end portion 11 can be a plate-like structure to stably retain the driver 3 between the stator structure 1 and the rotor structure 2. The shaft portion 12 can be a cylindrical structure to provide support and to define the rotation axis A2. The above description is for exemplary purposes only and is not intended to limit the scope of the present disclosure.

The driver 3 can include a coil structure 31 and a magnetic body 32 that are disposed between the shaft portion 12 of the stator structure 1 and the housing portion 22 of the rotor structure 2. In practice, the coil structure 31 can include iron cores with coils wound thereon and be fixed to the shaft portion 12 of the stator structure 1. The magnetic body 32 can include one or more magnets and be fixed to the housing portion 22 of the rotor structure 2. Accordingly, the coil structure 31 and the magnetic body 32 can work with each other to produce an electromagnetic torque, thereby allowing the rotor structure 2 to rotate around the rotation axis A2 in a clockwise or counterclockwise direction. In order for the rotation of the rotor structure 2 to be more stable and smooth, the driver 3 can further include at least one bearing 33 that can be surroundingly disposed on the shaft portion 12 of the stator structure 1 and spaced apart from the coil structure 31. Depending on particular requirements, the base portion 21 of the rotor structure 2 can further include a limiting groove 211 located in the accommodating space 200, and the at least one bearing 33 is embedded in the limiting groove 211. The above description is for exemplary purposes only and is not intended to limit the scope of the present disclosure.

It is worth mentioning that the stator structure 1 can have a wire groove 100 extending through the end portion 11 and the shaft portion 12 for allowing wire(s) from the light emitting unit 4 to pass therethrough. Therefore, the wire(s) will not interfere with mechanical parts, so that the headlight can work normally for a long period of time.

The light emitting unit 4 can be fixed to the carrying surface 201 of the rotor structure 2 via a circuit board having high thermal conductivity (not numbered) such as a metal core PCB (MCPCB). The circuit board at least has driving functions of the light emitting unit 4, and can drive the light emitting unit 4 according to received signals, so as to allow the light emitting unit 4 to produce a target lighting effect (e.g., a color or brightness effect). More specifically, the light emitting unit 4 is mounted on and electrically connected to the circuit board, and the circuit board is fixed to the carrying surface 201 of the rotor structure 2. In practice, the light emitting unit 4 can be an LED package structure that includes one or more light emitting units. The above description is for exemplary purposes only and is not intended to limit the scope of the present disclosure.

It should be finally noted that the control unit 6 is located on the end portion 11 of the stator structure 1 rather than located in the accommodating space 200. The control unit 6 can include a control PCB and one or more sensors (e.g., an accelerometer and a gyroscope). The control PCB can have a motor driver IC and its related components provided thereon.

Figure 14:
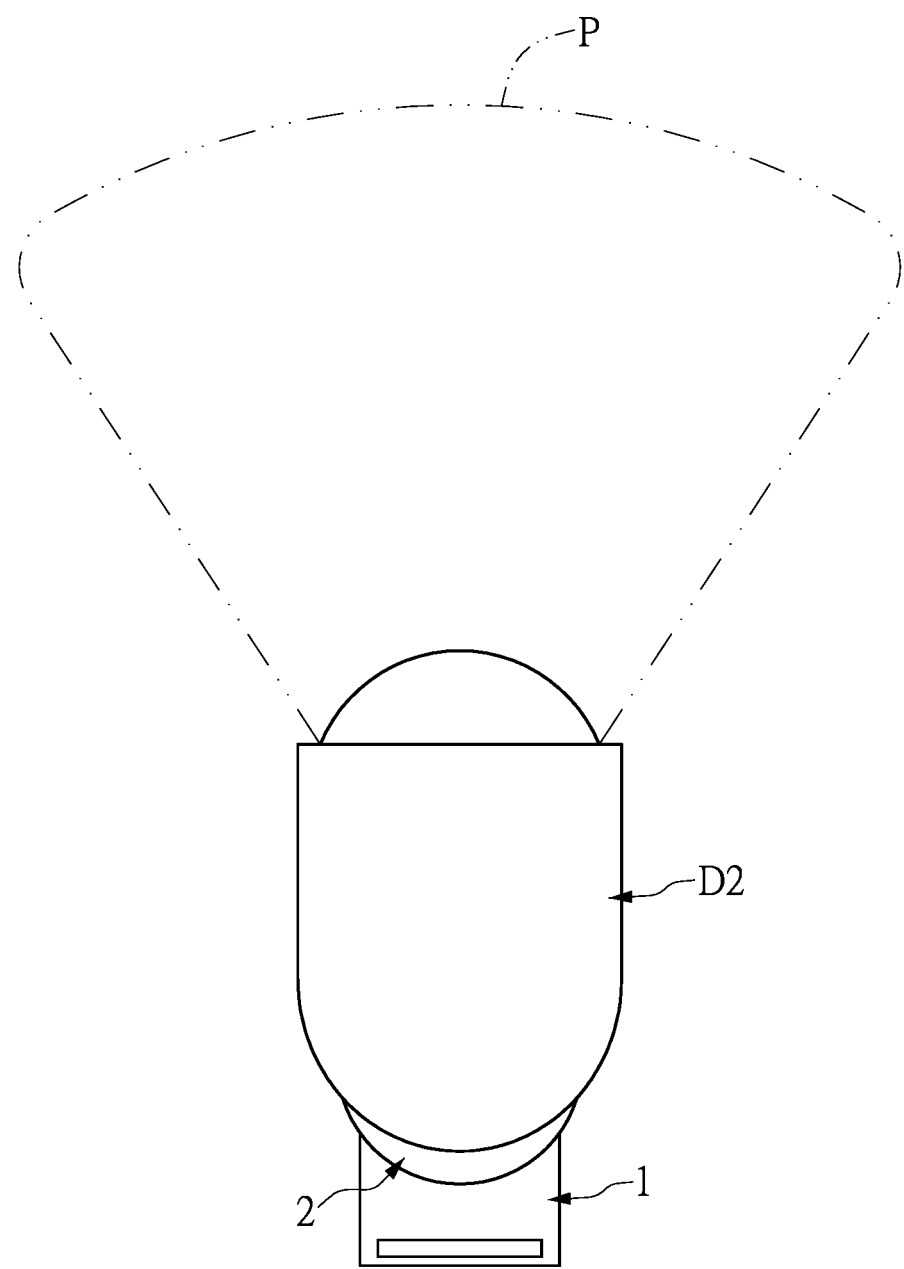
FIG. 14 to FIG. 16 show operations of the adaptive illuminating headlight according to the second embodiment of the present disclosure.
Figure 15:
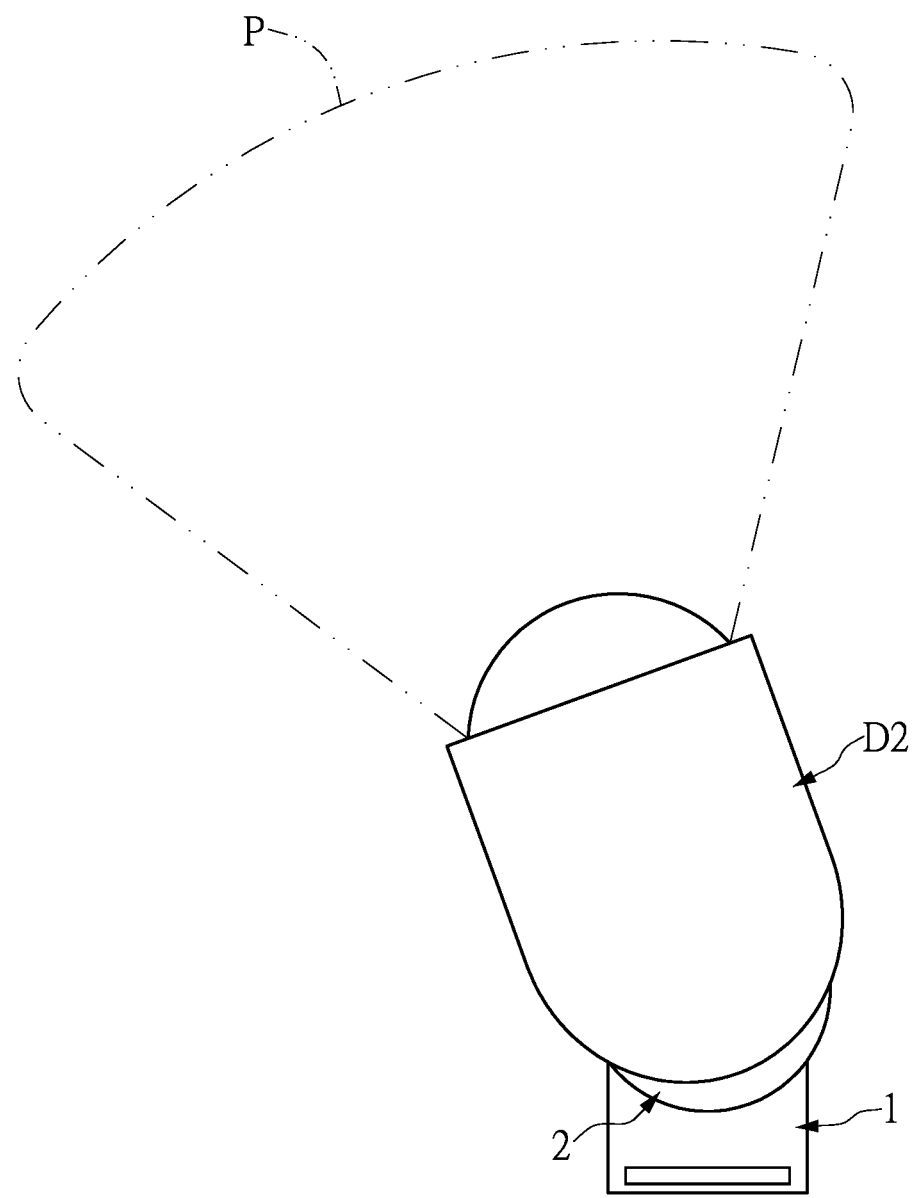
Figure 16:
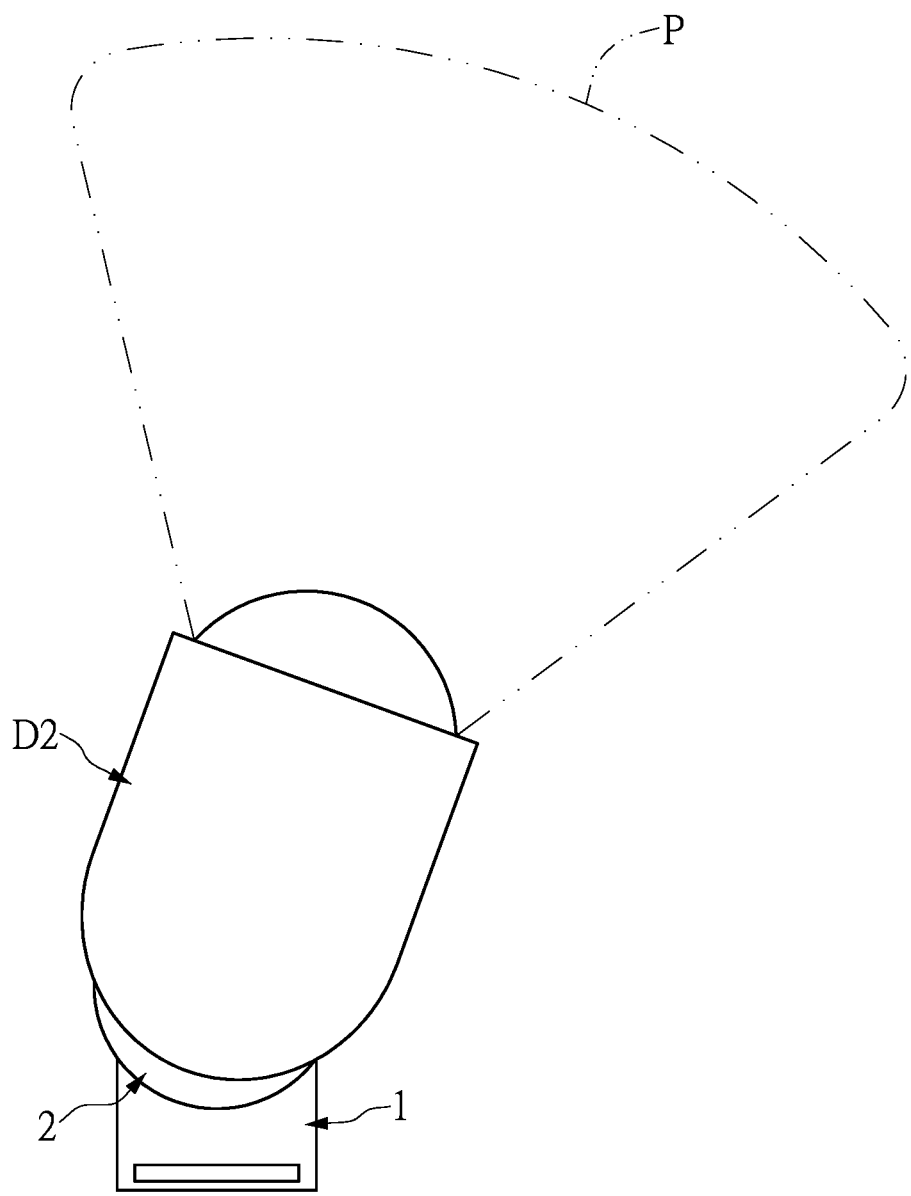

Reference is made to FIG. 14 to FIG. 16, which show operations of the adaptive illuminating headlight D2. When a vehicle with the adaptive illuminating headlight D2 is running on a straight road, the control unit 6 will not cause an operation of the driver 3 and no rotation is imparted to the light emitting unit 4 and the optical assembly 5 (e.g., optical lens). Thus, a resulting illumination pattern P is directly in front of the vehicle, as shown in FIG. 14. When a vehicle with the adaptive illuminating headlight D2 is running on a curved road, the control unit 6 causes an operation of the driver 3 to bring about changes in magnetic field according to a posture change of a vehicle body, such that the light emitting unit 4 and the optical assembly 5 are driven by the rotor structure 2 to rotate left or right through a predetermined angle, as shown in FIG. 15 and FIG. 16. Thus, a resulting illumination pattern P can illuminate any blind spots on the curved road in front of the vehicle.

Third Embodiment

Figure 17:
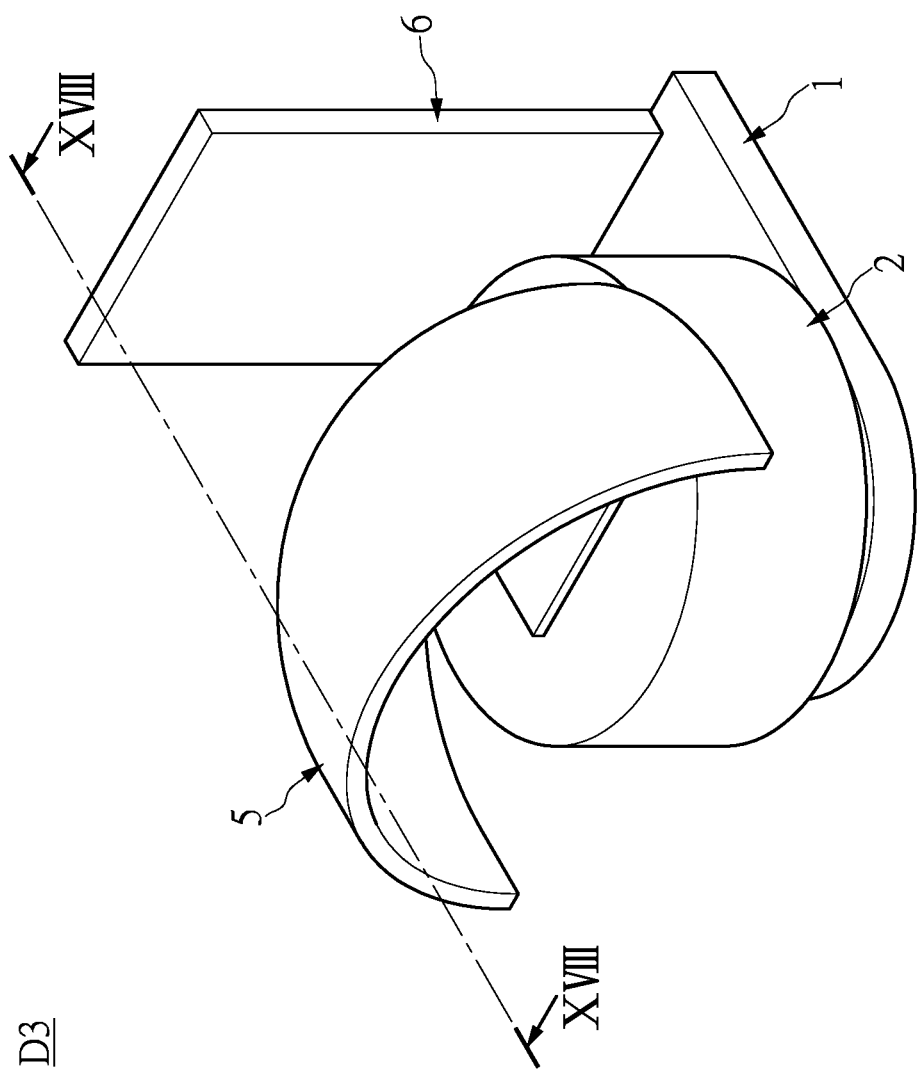
FIG. 17 is a perspective assembled view of an adaptive illuminating headlight according to a third embodiment of the present disclosure.
Figure 18:
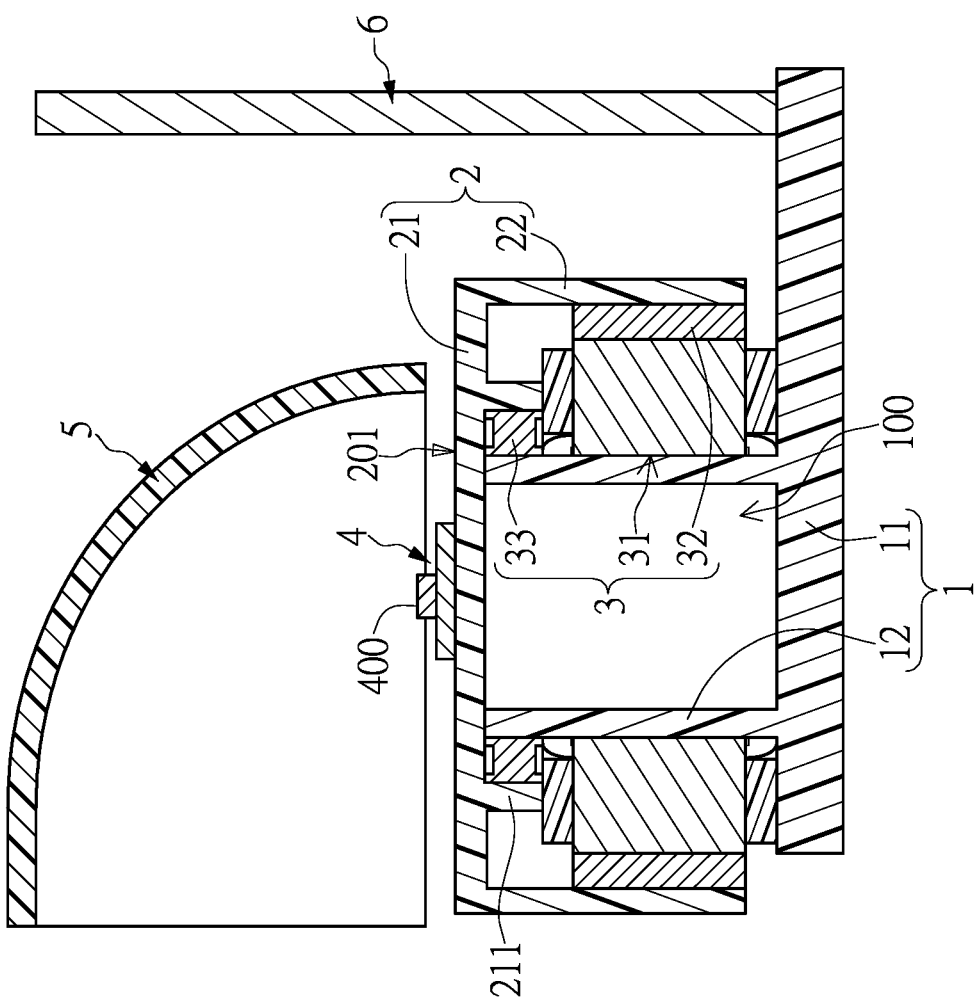
FIG. 18 is a schematic cross-sectional view taken along line XVIII-XVIII of FIG. 17.
Figure 19:
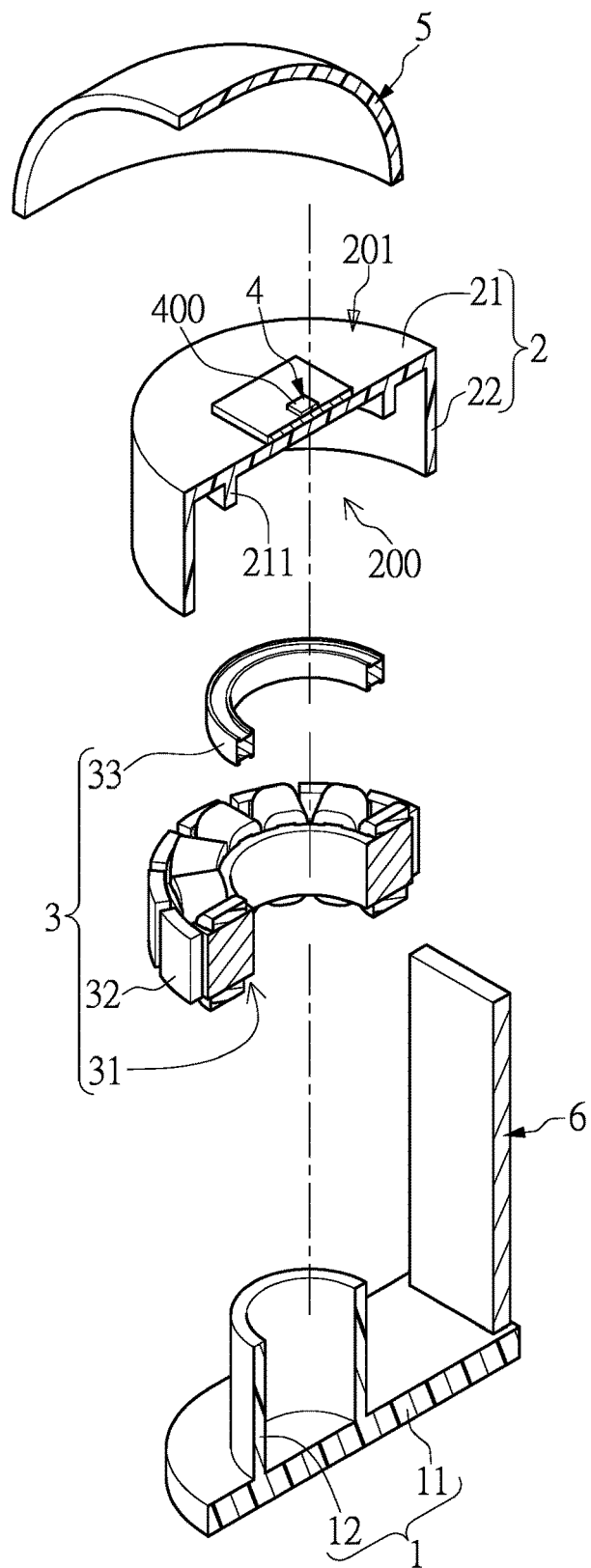
FIG. 19 is a perspective exploded view of the adaptive illuminating headlight according to the third embodiment of the present disclosure.

Reference is made to FIG. 17 to FIG. 19, which show a structure of an adaptive illuminating headlight D3 according to the third embodiment of the present disclosure. As shown in the above figures, the adaptive illuminating headlight D3 mainly includes a stator structure 1, a rotor structure 2, a driver 3, a light emitting unit 4, an optical assembly 5, and a control unit 6. The rotor structure 2 is configured to rotate relative to the stator structure 1 and has a carrying surface 201. The driver 3 is arranged between the stator structure 1 and the rotor structure 2 to drive the rotor structure 2. The light emitting unit 4 is arranged on the carrying surface 201 of the rotor structure 2 to emit an illumination light beam. The optical assembly 5 is configured to allow the illumination light beam to project outwardly so as to produce an illumination pattern. The optical assembly 5 is integrally connected to the rotor structure 2. The control unit 6 is configured to cause an operation of the driver 3 to bring about changes in magnetic field according to a posture change of a vehicle body, such that the light emitting unit 4 and the optical assembly 5 are driven by the rotor structure 2 to rotate through a predetermined angle. The adaptive illuminating headlight D3 can be installed on a two-wheel or four-wheel motor vehicle V such as a fuel or electric motorcycle, such that the vehicle V can be provided with sufficient frontal illumination when turning, thereby reducing or even eliminating a dark region in front of the vehicle V.

The headlight structure of the present embodiment is substantially the same as that of the second embodiment, but the optical system of the present embodiment does not include an optical lens and a light distributing member. In the optical system of the present embodiment, an illumination light beam emitted from the light emitting unit 4 can be reflected by a reflecting surface 510 of a light guiding member 51 to project outwardly along a predetermined path. Therefore, an illumination pattern can be produced for road illumination without using an optical lens and a light distribution member for light distribution, but a cut-off line thereof is indistinct. The relevant technical details mentioned in the second embodiment still apply in the present embodiment and will not be repeated herein for the sake of brevity. Similarly, the technical details mentioned in the present embodiment can also be applied to the second embodiment.

Beneficial Effects of the Embodiments

In the adaptive illuminating headlight of the present disclosure, by virtue of the stator structure and the rotor structure being compactly integrated with the driver, the light emitting unit, the optical assembly, and the control unit, an overall structure is a simple, reliable, and durable. More specifically, the driver and the control unit are integrated into the rotor structure, such that they are not easily affected by external environmental factors such as water and dust, thereby extending the lifespan thereof.

The adaptive illuminating headlight of the present disclosure can be installed on a two-wheel or four-wheel vehicle for use. When the vehicle is making a turn or running on a curved road, the control unit can cause an operation of the driver according to a posture change of a vehicle body (e.g., the vehicle body leans to the left or right at an angle relative to a road surface), such that the light emitting unit and the optical assembly are driven by the rotor structure to rotate through a predetermined angle, so as to reduce or even eliminate a dark region in front of the vehicle.

In a headlight structure of the present disclosure, the light emitting unit can be fixed to the carrying surface of the rotor structure via a circuit board having high thermal conductivity, and the rotor structure and the connecting structure can be formed into a unitary structure from a metal material. Accordingly, heat generated by the light emitting unit can be quickly transmitted to peripheral regions of the rotor structure and the connecting structure through the circuit board and dissipated to the outside.

In the headlight structure of the present disclosure, wires can extend through the stator structure and will not be rotated with the rotor structure and interfered with the mechanical parts, such that the headlight can have better availability. Furthermore, the headlight can have a smaller volume due to an arrangement of the driver inside the rotor structure. In addition, the driver only affects the rotor structure and other parts driven by the rotor structure, such that the driving force thereof is smaller and the thermal effect thereof is lower.

The adaptive illuminating headlight of the present disclosure has a low beam with a follow-up lighting effect and a high beam, and the low beam can meet the requirements of motor vehicle regulations during a follow-up process and does not cause glare to an oncoming vehicle.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An adaptive illuminating headlight installed on a vehicle for use, comprising:
   a stator structure;
   a rotor structure configured to rotate relative to the stator structure and having a carrying surface;
   a driver arranged between the stator structure and the rotor structure to drive the rotor structure;
   a light emitting unit arranged on the carrying surface to emit an illumination light beam;
   an optical assembly configured to allow the illumination light beam to project outwardly so as to produce an illumination pattern; and
   a control unit configured to control the driver to operate according to a posture change of a vehicle body, such that the light emitting unit is driven by the rotor structure to rotate through a predetermined angle;
   wherein the rotor structure includes a base portion and a housing portion extending from the base portion, the carrying surface is located on the base portion, and the base portion and the housing portion jointly define an accommodating space; the stator structure is located in the accommodating space and includes an end portion and a shaft portion extending from the end portion, and the shaft portion is closer to the base portion than the end portion;
   wherein the driver includes a coil structure, a magnetic body, and at least one bearing, the coil structure and the magnetic body are disposed between the shaft portion and the housing portion, and the at least one bearing is surroundingly disposed on the shaft portion and spaced apart from the coil structure;
   wherein the control unit includes a control printed circuit board located in the accommodating space that is closed by a back cover.

2. The adaptive illuminating headlight according to claim 1, wherein the optical assembly includes an optical lens that is integrally connected with the rotor structure via a connecting structure, and a light input surface of the optical lens is opposite to a light emitting surface of the light emitting unit.

3. The adaptive illuminating headlight according to claim 2, wherein the light emitting unit is configured to emit the illumination light beam toward the light input surface of the optical lens.

4. The adaptive illuminating headlight according to claim 1, wherein the coil structure is fixed to the shaft portion of the stator structure, and the magnetic body is fixed to the housing portion of the rotor structure.

5. The adaptive illuminating headlight according to claim 1, wherein the optical assembly includes a light guiding member, an optical lens, and a light distributing member, the light guiding member is configured to guide the illumination light beam to travel along a predetermined path, the optical lens and the light distributing member are arranged at positions on the predetermined path, and the light distributing member is located between the optical lens and the light emitting unit to selectively block the illumination light beam so as to modify the illumination pattern.

6. The adaptive illuminating headlight according to claim 5, wherein the light guiding member, the optical lens, and the light distributing member are configured to be driven by the rotor structure so as to simultaneously rotate with the light emitting unit; wherein the light emitting unit has a light emitting surface, and the light guiding member has a reflecting surface that covers the light emitting surface.

7. The adaptive illuminating headlight according to claim 6, wherein the light emitting unit is configured to emit the illumination light beam toward the reflecting surface of the light guiding member.

8. The adaptive illuminating headlight according to claim 5, wherein the light distributing member is configured to move between a first position and a second position below the first position; wherein the light distributing member at the first position blocks a portion of the illumination light beam travelling along the predetermined path, such that the illumination pattern is a low beam illumination pattern; wherein the light distributing member at the second position allows all the illumination light beam travelling along the predetermined path to enter the optical lens through a light input surface of the optical lens, such that the illumination pattern is a high beam illumination pattern.

9. The adaptive illuminating headlight according to claim 1, wherein the base portion of the rotor structure further includes a limiting groove located in the accommodating space, and the at least one bearing is embedded in the limiting groove.

10. The adaptive illuminating headlight according to claim 1, wherein the optical assembly includes a light guiding member that is configured to guide the illumination light beam to travel along a predetermined path.

11. The adaptive illuminating headlight according to claim 10, wherein the light guiding member corresponds in position to the light emitting unit and has a reflecting surface that covers a light emitting surface of the light emitting unit.

* * * * *